April 16, 1946.  B. BOLLI  2,398,690
INTERNAL-COMBUSTION ENGINE
Filed Sept. 13, 1944
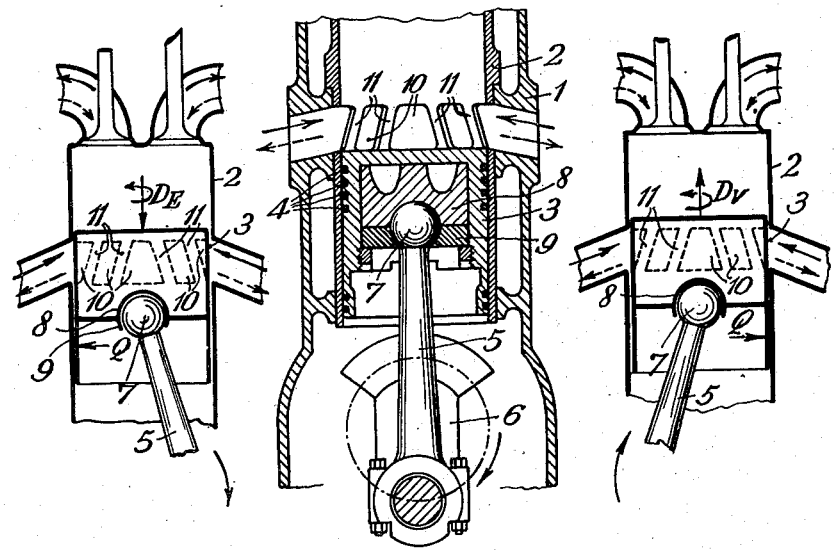
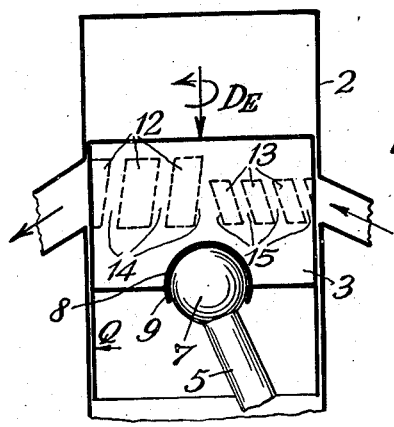
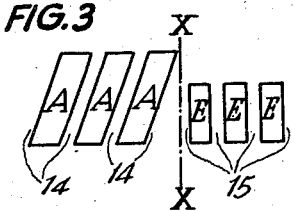
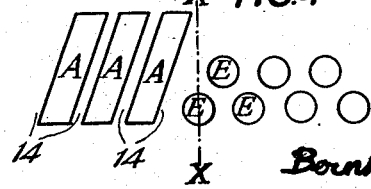
INVENTOR:
Bernhard Bolli Patented Apr. 16, 1946

2,398,690

UNITED STATES PATENT OFFICE 2,398,690

INTERNAL-COMBUSTION ENGINE

Bernhard Bolli, Arbon, Switzerland, assignor to Société Anonyme Adolphe Saurer, Arbon, Switzerland Application September 13, 1944, Serial No. 553,918
In Switzerland June 26, 1943

7 Claims. (Cl. 123—45)

This invention relates to internal combustion engines and more especially to the type of engines in which the piston reciprocating in the cylinder is capable of circumferential motion about the cylinder axis and the piston-swept surface of the cylinder is formed with intake and exhaust ports controlled by the piston.

In engines with piston-controlled ports the wear on the piston, the piston rings and the piston-swept surface of the cylinder wall is greater than in engines in which the cylinder wall is devoid of ports. Experience has shown that the sliding properties of the piston and of the piston rings in slotted cylinders can be substantially improved by enabling the piston to perform slight circumferential movements during the operation of the engine. To this end the piston must be connected with the connecting rod by a ball joint.

In known engines of this type the piston is positively rotated by means of a turning mechanism. However, such mechanism is expensive and hardly fit for use in small high-speed engines.

I have now found that only little power is required to start and keep up a rotational movement of a piston and that a piston jointed to the connecting rod by a universal joint will start rotating without any noticeable impulse, however only at a slow rate of speed.

I have further found that this inherent tendency of such a piston to rotate about its longitudinal axis during operation is intensified if at least part of the sections of the cylinder wall which are located between the ports, extend at an acute angle to a parallel of the cylinder axis, this angle being so chosen that the twisting effect exerted by these sections on the piston which slides across them under the side pressure exerted on it by the pendulum movement of the connecting rod, always acts in the same direction of rotation.

In cylinders with intake or exhaust ports distributed over the entire inner circumferential surface of the cylinder the sections enclosed between the ports located on one side of an axial plane should be inclined in one direction of rotation, for example to the left, the sections enclosed between the ports located on the other side of said plane in the opposite direction, for example to the right.

In cylinders having exhaust ports formed on one side of the axial plane the wall sections between these exhaust ports should be inclined in one direction of rotation (for example towards the left), while the sections enclosed between the intake ports should be inclined in the opposite direction (for example towards the right).

Since to keep the piston rotating, only a relatively small twisting effect is required, it will often be sufficient to have inclined wall sections on one longitudinal half of the cylinder, for example between the exhaust ports. The ports in the other half of the cylinder wall may then enclose between them wall sections which extend in parallel to the cylinder axis. Instead of that staggered rows of circular ports may be provided on this half of the cylinder wall.

Several embodiments of the invention are illustrated diagrammatically by way of example in the accompanying drawing, in which Fig. 1 is a cross section of that part of the cylinder of an internal combustion engine which is formed with ports distributed over the entire circumference of the cylinder wall.

Fig. 1a is a similar view of a diagrammatic showing illustrating the twisting effect of the inclined wall sections on the piston during its outward stroke, while Fig. 1b illustrates the twisting effect on the piston during its inward stroke.

Fig. 2 illustrates another embodiment of this invention, in which on one side of the axial plane the cylinder wall is formed wtih inclined exhaust ports, while the other half of the cylinder wall is formed with inclined intake ports of considerably smaller size.

Fig. 3 is a diagrammatic development of part of a cylinder wall formed with a group of inclined ports and wall sections and a group of axially extending ports and wall sections.

Fig. 4 is a development of part of a cylinder wall formed with a group of inclined rhomboid ports and a group of staggered rows of circular ports.

Referring to the drawing and first to Fig. 1, 1 is the engine casing, 2 the working cylinder, 3 the piston, 4 the piston rings. The piston 3 is operatively connected with a crankshaft 6 by means of a connecting rod 5 having a spherical head 7 which projects into a semi-spherical socket 8 and locking plate 9 forming part of the piston. Alternatively a spherical head may be provided on the piston and the connecting rod may carry a mating spherical socket.

This universal joint enables the piston to rotate about its longitudinal axis. The cylinder wall is formed with a circular row of ports 10, which may operate either as exhaust or as intake-ports. These ports have the contour of rhomboids with the short sides extending at right angles to the cylinder axis, so that the long sides extend at an acute angle to this axis and to the generating lines of the piston circumference. The cylinder wall sections 11 between the rhomboid ports are also rhomboid shaped. I have found that these sections or their long edges impart to the piston reciprocating axially across them a slight impulse for rotatory motion in the direction of inclination of the port edges.

In Fig. 1a the piston is shown on its outward (intake) stroke and the ports 10 are acting as intake ports, as indicated by the full-line arrows. During this stroke the piston is subjected to a side reaction pressure Q, provided the crankshaft 6 rotates in the direction of the arrow shown at the bottom. The wall sections slanting towards the left impart to the piston, a twisting effect De which induces it to rotate in a direction which, when seen from the cylinder head, extends towards the left.

On the other hand during the inward stroke of the piston the side reaction pressure Q acts on the right hand half of the cylinder, as indicated in Fig. 1b.

If, however, the wall sections 11 between the ports situated on that side, across which the piston then slides, were inclined also to the left, the twisting effect imparted to the piston, when seen from the cylinder head, would be directed to the right. Since however the piston shall rotate continuously in the same direction, the ports and sections on the right hand half of the cylinder are inclined in the opposite direction, i. e. to the right.

As shown in Fig. 1b, the piston 3 is influenced in the inward stroke (compression and exhaust stroke) by the twisting effect Dv to rotate towards the left, when seen from the cylinder head, i. e. in the same direction as during its outward stroke. Therefore, in the operation of the engine the piston is induced by the opposite inclination of the wall sections on the two longitudinal halves of the cylinder to rotate about its longitudinal axis in one and the same direction at all times.

By this means the rotational movement striven at, which, as experience has shown, has a beneficial effect on the piston, the piston rings and the cylinder as regards minimizing of wear, is obtained without the use of special mechanical means. The piston rings, which due to their inherent resilience bear uniformly against the cylinder wall, are not influenced by the inclined wall sections to rotate, because the two components of the twisting effect compensate each other. However, as the piston rings bear against a side wall of the piston grooves, they are carried along by the piston due to their frictional engagement. They rotate in the same direction as, however slower than, the piston. This difference in the rotational velocity of the parts effectively prevents the piston rings from sticking.

In Fig. 2 a second embodiment of the invention is illustrated. Here the piston-swept part of the cylinder wall is formed in one longitudinal half with exhaust slots 12, on the other half with intake slots 13. The wall sections 14 between the exhaust slots are inclined to the cylinder axis towards the left and the piston on its outward stroke when sliding across them under side reaction pressure, is imparted a twisting effect De, as indicated in Fig. 2, which, when seen from the cylinder cover, is directed toward the left. Therefore, here the same conditions exist during the outward stroke as in the embodiment described above.

On the other hand during the inward stroke the piston, under the side reaction pressure exerted upon it by the connecting rod, slides across the inclined wall sections 15 between the intake ports 13.

Here these sections are inclined in the opposite sense because now the piston is imparted a twisting effect Dv in the same direction as that in which the piston rotates when on its outward stroke, that is, in the direction towards the left in the arrangement shown in Fig. 2, if seen from the cylinder head.

Since in the engine illustrated in Fig. 2 the intake ports are shorter than the exhaust ports, the twisting effect Dv imparted to the piston during the inward stroke is smaller than the twisting effect De exerted on it in the outward stroke. The sum total of these two twisting effects, however, results in a rotational movement of the piston sufficient to assure the improved running conditions and the minimizing of wear striven at. In the embodiment shown in Fig. 2 the piston rings move about the cylinder axis in a sort of ratchet movement.

The twisting effect exerted on the piston may be sufficient in an engine as shown in Fig. 2, also if the inclined wall sections on the intake side of the cylinder extend in parallel to the cylinder axis and do not exert such an effect. The rotation on the piston is then effected solely by the influence of the inclined wall sections between the exhaust ports.

Fig. 3 is a development of the piston-swept part of a cylinder with the ports located on either side of the longitudinal middle plane X—X of the cylinder. The wall sections 14 between the exhaust ports A are inclined, whereas the wall sections 15 between the ports E extend in parallel to the cylinder axis.

Fig. 4 shows a similar development of the cylinder wall, in which however the intake ports E are staggered rows of cylindrical perforations. Rotatory movement of the piston is induced here only by the wall sections 14 on the exhaust side, the twisting impulse being transmitted to the piston in the course of its outward stroke, if the crankshaft rotates in clockwise direction.

I wish it to be understood that I do not desire to be limited to the details of construction described in the specification and shown in the drawing, for obvious modifications occur to a person skilled in the art.

I claim:

1. Internal combustion engine comprising in combination, a cylinder, a piston arranged in said cylinder for axial reciprocation, a connecting rod and a ball joint between said piston and said connecting rod, the piston-swept area of the cylinder wall being formed with ports controlled by the cylindrical surface of said piston, the cylinder wall sections between some of said ports being inclined at an angle other than a right angle to a cross-sectional plane laid through the cylinder wall.

2. Internal combustion engine comprising in combination, a cylinder, a piston arranged in said cylinder for axial reciprocation, a connecting rod and a ball joint and between said piston and said connecting rod, the piston-swept area of the cylinder wall being formed throughout its circumference with intake ports controlled by the cylindrical surface of said piston, the cylinder wall sections between some of said ports being inclined at an angle other than a right angle to a cross-sectional plane laid through the cylinder wall on one half of said wall and at an opposite angle to said plane on the other half.

3. Internal combustion engine comprising in combination, a cylinder, a piston arranged in said cylinder for axial reciprocation, a connecting rod and a balljoint between said piston and said connecting rod, the piston-swept area of the cylinder wall being formed throughout its circumference with exhaust ports controlled by the cylindrical surface of said piston, the cylinder wall sections between some of said ports being inclined at an angle other than a right angle to a cross-sectional plane laid through the cylinder wall.

4. Internal combustion engine comprising in combination, a cylinder, a piston arranged in said cylinder for axial reciprocation, a connecting rod and a balljoint between said piston and said connecting rod, the piston-swept area of the cylinder wall being formed with intake and exhaust ports controlled by the cylindrical surface of said piston the cylinder wall sections between said intake ports being inclined at an angle other than a right angle, the sections between said exhaust ports at an opposite angle to a cross-sectional plane laid through the cylinder wall.

5. Internal combustion engine comprising in combination, a cylinder, a piston arranged in said cylinder for axial reciprocation, a connecting rod and a balljoint between said piston and said connecting rod, the piston-swept area of the cylinder wall being formed with intake and exhaust ports controlled by the cylindrical surface of said piston, said intake ports being arranged on one side and said exhaust ports on the other side of an axial middle plane laid through said cylinder wall, the cylinder wall sections between said intake ports being inclined at an angle, other than a right angle, the sections between said exhaust ports at an opposite angle to a cross-sectional plane laid through the cylinder wall.

6. Internal combustion engine comprising in combination, a cylinder, a piston arranged in said cylinder for axial reciprocation, a connecting rod and a balljoint between said piston and said connecting rod, the piston-swept area of the cylinder wall being formed with intake and exhaust ports controlled by the cylindrical surface of said piston, said intake ports being arranged on one side and said exhaust ports on the other side of an axial middle plane laid through said cylinder wall, the cylinder wall sections between one kind of ports being inclined at an angle other than a right angle to a cross-sectional plane laid through the cylinder wall, the cylinder wall sections between the other kind of ports extending in parallel to the cylinder axis.

7. Internal combustion engine comprising in combination, a cylinder, a piston arranged in said cylinder for axial reciprocation, a connecting rod and a balljoint between said piston and said connecting rod, the piston-swept area of the cylinder wall being formed with intake and exhaust ports controlled by the cylindrical surface of said piston, said intake ports being arranged on one side and said exhaust ports on the other side of an axial middle plane laid through said cylinder wall, the cylinder wall sections between one kind of ports being inclined at an angle other than a right angle to a cross-sectional plane laid through the cylinder wall, the other kind of ports being cylindrical apertures arranged in staggered relation.

BERNHARD BOLLI.